(12) United States Patent
Aoyagi et al.

(10) Patent No.: US 7,732,549 B2
(45) Date of Patent: Jun. 8, 2010

(54) MULTI-BRANCHED POLYMER

(75) Inventors: Koichiro Aoyagi, Chiyoda-ku (JP);
Takeshi Niitani, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 734 days.

(21) Appl. No.: 10/595,974

(22) PCT Filed: Nov. 25, 2004

(86) PCT No.: PCT/JP2004/017897

§ 371 (c)(1),
(2), (4) Date: May 23, 2006

(87) PCT Pub. No.: WO2005/052009

PCT Pub. Date: Jun. 9, 2005

(65) Prior Publication Data

US 2007/0142504 A1    Jun. 21, 2007

(30) Foreign Application Priority Data

Nov. 26, 2003    (JP) ............................. 2003-394867

(51) Int. Cl.
C08F 4/06 (2006.01)
C08F 12/16 (2006.01)
C08F 20/22 (2006.01)

(52) U.S. Cl. .................. 526/292.5; 526/135; 526/292.4

(58) Field of Classification Search ................ 526/135, 526/292.1, 292.4, 292.5
See application file for complete search history.

(56) References Cited

U.S. PATENT DOCUMENTS

| 5,102,966 A | 4/1992 | Higashimura et al. |
| 5,763,548 A * | 6/1998 | Matyjaszewski et al. .... 526/135 |
| 6,255,424 B1 | 7/2001 | Knauss |
| 6,414,101 B1 | 7/2002 | Watanabe et al. |
| 6,551,758 B2 * | 4/2003 | Ohsawa et al. ........... 430/270.1 |
| 6,639,032 B2 * | 10/2003 | Wang ........................ 526/135 |
| 6,713,564 B1 | 3/2004 | Nobuhara et al. |

FOREIGN PATENT DOCUMENTS

| JP | 04-363306 A | 12/1992 |
| JP | 05-043615 A | 2/1993 |
| JP | 11-029617 A | 2/1999 |
| JP | 2000-344836 A | 12/2000 |
| JP | 2001-139647 A | 5/2001 |
| JP | 2001-181352 A | 7/2001 |
| JP | 2002-226513 A | 8/2002 |

OTHER PUBLICATIONS

Zhang et al. (Radical Polymerization: A Covalent-Chemistry Approach to Giant Macromolecules and Their Wetting Behavior on Solid Substrates. Angew. Chem. Int. Ed. 2004, 43, pp. 5185-5188).*
Scott G. Gaynor, et al., Synthesis of Branched and Hyperbranched Polystyrenes, Macromolecules, 29, 1996, pp. 1079-1081.
Marc W. Weimer, et al., Importance of Active-Site Reactivity and Reaction Conditions in the Preparation of Hyperbranched Polymers by Self-Condensing Vinyl Polymerization: Highly Branched vs. Linear Poly [4-(chloromethyl) styrene] by Metal-Catalyzed "Living" Radical Polymerization, Journal of Polymer Science: Part A: Polymer Chemistry , vol. 36, pp. 955-970 (1998).
K. Matyjaszewski, et al., Preparation of Hyperbranched Polyacrylates by Atom Transfer Radical Polymerization. 1. Acrylic AB* Monomers in "Living" Radical Polymerizations, Macromolecules, 30, 1997, pp. 5192-5194.
E. Malmstrom et al., "Hyperbranched Aliphatic Polyesters", Macromolecules, vol. 28, No. 5, Feb. 27, 1995, pp. 1698-1703.

* cited by examiner

Primary Examiner—Milton I Cano
Assistant Examiner—Brieann R Fink
(74) Attorney, Agent, or Firm—Oliff & Berridge, PLC

(57) ABSTRACT

The aim of the present invention is to provide a multi-branched polymer, in which branch terminals can be easily modified and which have a high degree of branching and narrow dispersion. By polymerizing a compound having 2 or more polymerization-initiation sites and polymerizable unsaturated bonds with a living radical polymerization method using a metal catalyst, it is possible to produce a multi-branched polymer with narrow dispersion and a high degree of branching and having repeating units represented by the formula (I):

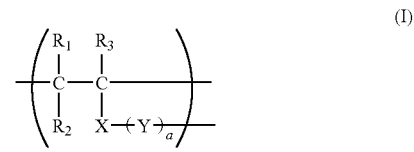

wherein $R_1$ to $R_3$ each independently represents hydrogen or a hydrocarbon group, $R_1$ may be bonded to $R_3$ to form a ring; X represents a connecting group having a valence of 3 or higher; Y may be the same or different and each represents a functional group which may have a halogen atom at a terminal thereof; and a is an integer of 2 or larger.

12 Claims, 1 Drawing Sheet

MULTI-BRANCHED POLYMER

CLAIM OF PRIORITY

This is a U.S. National Phase Application under 35 U.S.C. §371 of International Patent Application No. PCT/JP2004/017897 filed on Nov. 25, 2004. The International Application was published in Japanese on Jun. 9, 2005 as WO 2005/052009 A1 under PCT Article 21(2), which is incorporated by reference in its entirety.

TECHNICAL FIELD

The present invention relates to a novel multi-branched polymer and hyperbranched polymer and more specifically, relates to a novel multi-branched polymer and hyperbranched polymer, in which branch terminals can be easily modified and which have a high degree of branching and a low degree of dispersion (narrow dispersion).

BACKGROUND ART

Hyperbranched polymers are polymers whose structures resemble those of dendrimers. These polymers have recently attracted attention since they can be readily synthesized compared to dendrimers although they have similar chemical and physical properties to those of dendrimers.

Regarding hyperbranched polymers, there hitherto have been a few reports on hyperbranched polymers with polystyrene structures and it is known that it is possible to synthesize desired multi-branched polymers by providing a monomer with a reaction initiation point (please refer to Macromolecules, 29, 1079 (1996), J. Polym. Sci., Part A:

Polym. Chem., 36, 955 (1998)).

However, it has not been necessarily easy to control the molecular weights or degrees of dispersion of the hyperbranched polymers described in these documents and especially in the case where the degree of branching was high, only polymers with a high degree of dispersion could be obtained.

Accordingly, there has been a demand for the development of hyperbranched polymers with excellent physical properties by controlling the proportion of branching, molecular weights, shapes, and so forth.

Moreover, there is a report on a method of synthesizing hyperbranched polyacrylates using an atom transfer radical polymerization (ATRP) method illustrating living radical polymerization of AB type acrylic monomers (please refer to Macromolecules, 30, 5192 (1997)). Although hyperbranched polymers with the AB*type acrylic monomers as the polymerization-initiation sites have been provided, the structures of the obtained hyperbranched polymers are not symmetric and the polymers are not those with so-called star polymer properties. Information on $AB_2$ type acrylic monomers has not been disclosed.

DISCLOSURE OF INVENTION

The present invention has been made taking such circumstances of prior arts into consideration and its task is to provide a multi-branched polymer whose hyperbranched polymer structure symmetry is preferable, and in which branch terminals can be easily modified and which has a high degree of branching and a narrow dispersion.

As a result of earnest research in order to solve the above task, the present inventors discovered that it is possible to readily obtain a multi-branched polymer in which branch terminals can be easily modified and which has a high degree of branching and a narrow dispersion by polymerizing a compound having 2 or more polymerization-initiation sites and polymerizable unsaturated bonds by a living radical polymerization method using a metal catalyst, and completed the present invention.

That is, the present invention relates to:

(1) a multi-branched polymer having repeating units represented by formula (I):

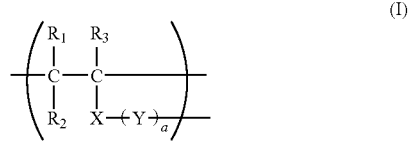

wherein $R_1$ to $R_3$ each independently represents hydrogen or a hydrocarbon group, and $R_1$ may be bonded to $R_3$ to form a ring; X represents a connecting group having a valence of 3 or higher; Y may be the same or different and each represents a functional group which may have an active halogen atom; and a is an integer of 2 or larger, (2) the multi-branched polymer according to (1), wherein the repeating units represented by the formula (I) are repeating units represented by formula (II):

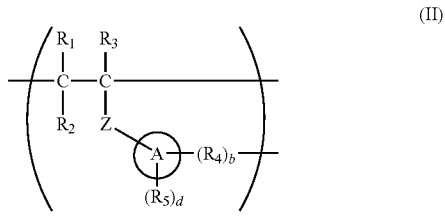

wherein $R_1$ to $R_3$ are as defined above; Z represents a single bond or a connecting group having a valence of 2 or higher; A represents an aromatic hydrocarbon group or an aromatic heterocyclic group; $R_4$ may be the same or different and each represents a functional group which may have an active halogen atom; b is an integer of 2 or larger; $R_5$ represents a halogen atom or an organic group and d is 0 or an integer of 1 or larger and $R_5$ may be the same or different when d is 2 or larger, (3) the multi-branched polymer according to (2), wherein in the formula (II), Z is a single bond; A is an aromatic hydrocarbon group; and $R_4$ is a functional group represented by formula (III):

wherein $R_6$ and $R_7$ each independently represents hydrogen, a halogen atom, an alkyl group which may have a substituent, or a linkage with other repeating units with a proviso that $R_6$ and $R_7$ do not become linkages with other repeating units at the same time, (4) the multi-branched polymer according to (1), wherein the repeating units represented by the formula (I) are repeating units represented by formula (IV):

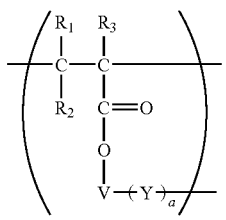
(IV)

wherein $R_1$ to $R_3$, $Y_1$ and a are as defined above; and V represents a connecting group having a valence of 3 or higher, (5) the multi-branched polymer according to (4), wherein V is a polyoxyalkylene group in the formula (IV), (6) the multi-branched polymer according to (4) or (5), wherein in the formula (IV), Y is a functional group represented by formula (V):

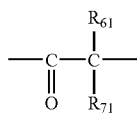
(V)

wherein $R_{61}$, and $R_{71}$, each independently represents hydrogen, a halogen atom, an alkyl group which may have a substituent, or a linkage with other repeating units with a proviso that $R_{61}$, and $R_{71}$, do not become linkages with other repeating units at the same time, (7) a multi-branched polymer obtained with a living radical polymerization method using a metal catalyst by polymerizing compounds represented by formula (VI):

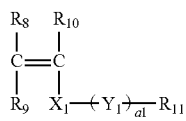
(VI)

wherein $R_8$ to $R_{10}$ each independently represents hydrogen or a hydrocarbon group, and $R_8$ may be bonded to $R_{10}$ to form a ring; $X_1$ represents a connecting group having a valence of 3 or higher; $Y_1$ may be the same or different and each represents a functional group which may have an active halogen atom; a1 is an integer of 2 or larger; $R_{11}$, represents a chlorine atom, a bromine atom, or an iodine atom, (8) the multi-branched polymer according to (7), wherein the compounds represented by the formula (VI) are compounds represented by formula (VII):

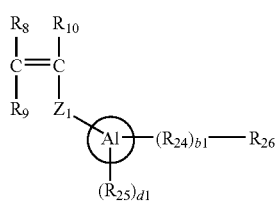
(VII)

wherein $R_8$ to $R_{10}$ are as defined above; $Z_1$ represents a single bond or a connecting group having a valence of 2 or higher; A1 represents an aromatic hydrocarbon group or an aromatic heterocyclic group; $R_{24}$ may be the same or different and each represents a functional group which may have an active halogen atom; b1 is an integer of 2 or larger; $R_{25}$ represents a halogen atom or an organic group and d1 is 0 or an integer of 1 or larger and $R_{25}$ may be the same or different when d1 is 2 or larger; $R_{26}$ represents a chlorine atom, a bromine atom, or an iodine atom, (9) the multi-branched polymer according to (8), wherein in the formula (VII), $Z_1$ is a single bond; A1 is an aromatic hydrocarbon group; and $R_{24}$ is a functional group represented by formula (VIII):

(VIII)

wherein $R_{60}$ and $R_{70}$ each independently represents hydrogen, a halogen atom, or a C1 to C6 alkyl group which may have a substituent with a proviso that $R_{60}$ and $R_{70}$ are not halogen atoms other than fluorine atoms at the same time,

(10) the multi-branched polymer according to (7), wherein the compounds represented by the formula (VI) are compounds represented by formula (IX):

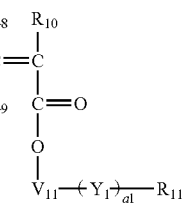
(IX)

wherein $R_8$ to $R_{10}$ are as defined above respectively; VI, represents a connecting group having a valence of 3 or higher; $Y_1$ may be the same or different and each represents a functional group which may have an active halogen atom; a1 is an integer of 2 or larger; and $R_{11}$, represents a chlorine atom, a bromine atom, or an iodine atom,

(11) the multi-branched polymer according to (10), wherein $V_{11}$ is a polyoxyalkylene group in the formula (IX),

(12) the multi-branched polymer according to (10) or (11), wherein in the formula (IX), $Y_1$ is a functional group represented by formula (X):

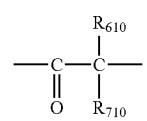
(X)

wherein $R_{610}$ and $R_{710}$ each independently represents hydrogen, a halogen atom, an alkyl group which may have a substituent, or a linkage with other repeating units with a proviso that $R_{610}$ and $R_{710}$ do not become linkages with other repeating units at the same time,

(13) the multi-branched polymer according to any one of (1) to (12), wherein the ratio (Mw/Mn) of weight average molecular weight (Mw) to number average molecular weight (Mn) of the polymer is between 1.01 and 9.99,

(14) the multi-branched polymer according to any one of (1) to (13), wherein the number average molecular weight (Mn) of the polymer is in a range between 200 and 20,000,000,

(15) the multi-branched polymer according to any one of (1) to (14), wherein the multi-branched polymer is a hyperbranched polymer,
(16) a hyperbranched polymer which is branched by carbon-carbon bond and has the ratio (Mw/Mn) of weight average molecular weight (Mw) to number average molecular weight (Mn) in a range between 1.01 and 9.99,
(17) a hyperbranched polymer obtained by polymerizing a compound having 2 or more polymerization-initiation sites and polymerizable unsaturated bonds by a living radical polymerization method using a metal catalyst,
(18) the hyperbranched polymer according to (16) or (17), wherein the number average molecular weight (Mn) of the polymer is in a range between 200 and 20,000,000,
(19) the hyperbranched polymer according to any one of (16) to (18), having a functional group at a polymer terminal, and
(20) a star polymer having the multi-branched polymer according to any one of (1) to (15) or the hyperbranched polymer according to any one of (16) to (19) as a core thereof.

The multi-branched polymers of the present invention will be described in detail below.

1) Multi-Branched Polymer (1) Multi-Branched Polymer

The multi-branched polymer of the present invention is characterized in that it has repeating units represented by the formula (I).

$R_1$ to $R_3$ each independently represents hydrogen or a hydrocarbon group in the formula (I). Examples of the hydrocarbon group include alkyl groups such as a methyl group, ethyl group, n-propyl group, isopropyl group, n-butyl group, sec-butyl group, isobutyl group, t-butyl group, n-pentyl group, and n-hexyl group; cycloalkyl groups such as a cyclopentyl group and cyclohexyl group; aryl groups such as a phenyl group, 1-naphthyl group, and 2-naphthyl group; and aralkyl groups such as a benzyl group. Although the number of carbon atoms in the hydrocarbon group is not particularly limited, 1 to 10 atoms are preferable.

Moreover, $R_1$ may be bonded to $R_3$ to form a ring.

X represents a connecting group having a valence of 3 or higher and is not limited as long as it is a functional group with 3 or more linkages. Specific examples include functional groups shown below.

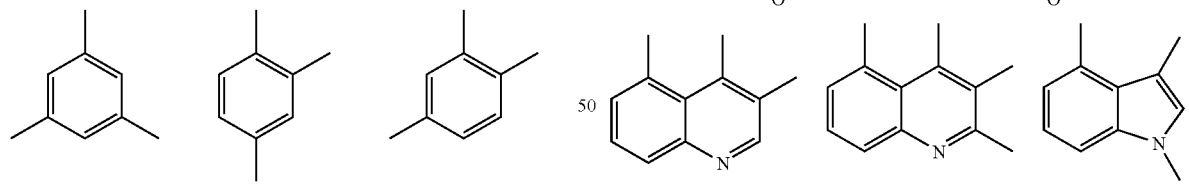

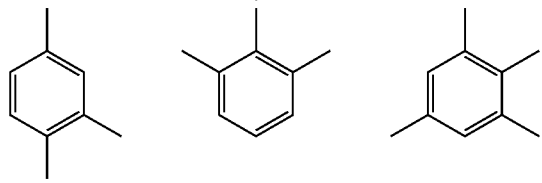

-continued

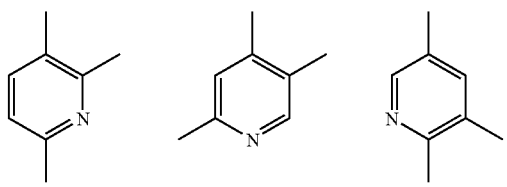

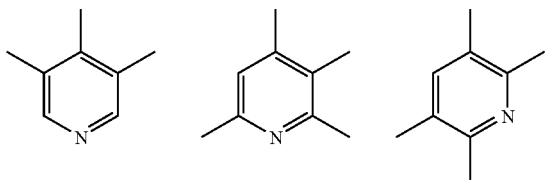

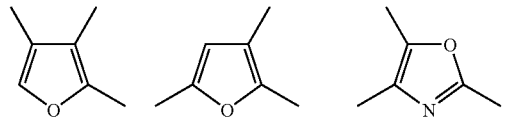

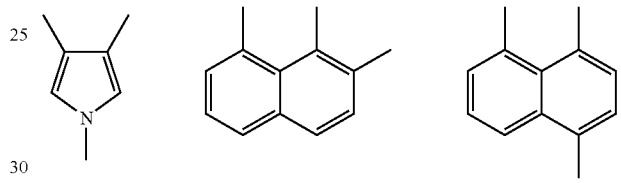

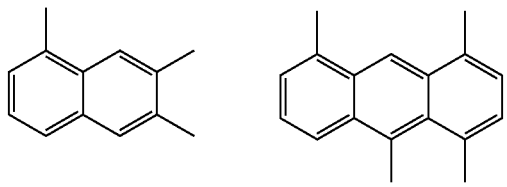

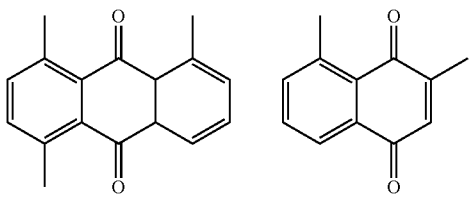

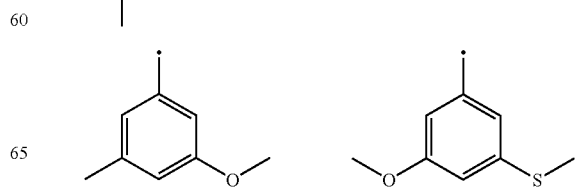

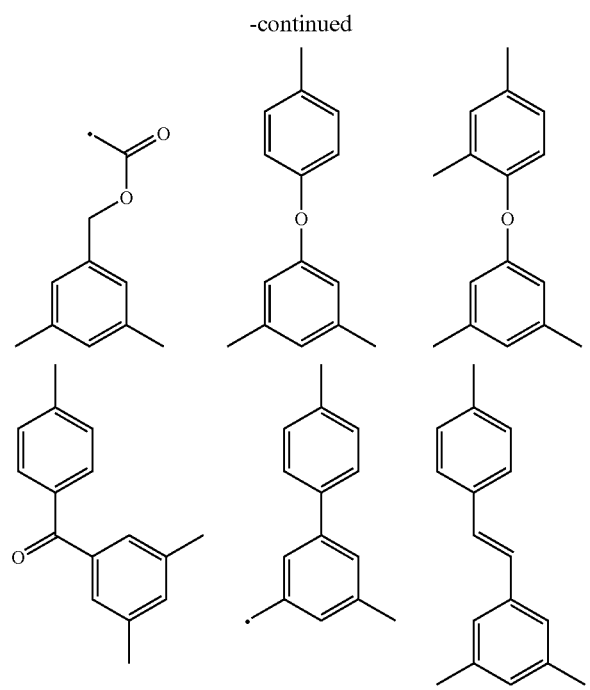
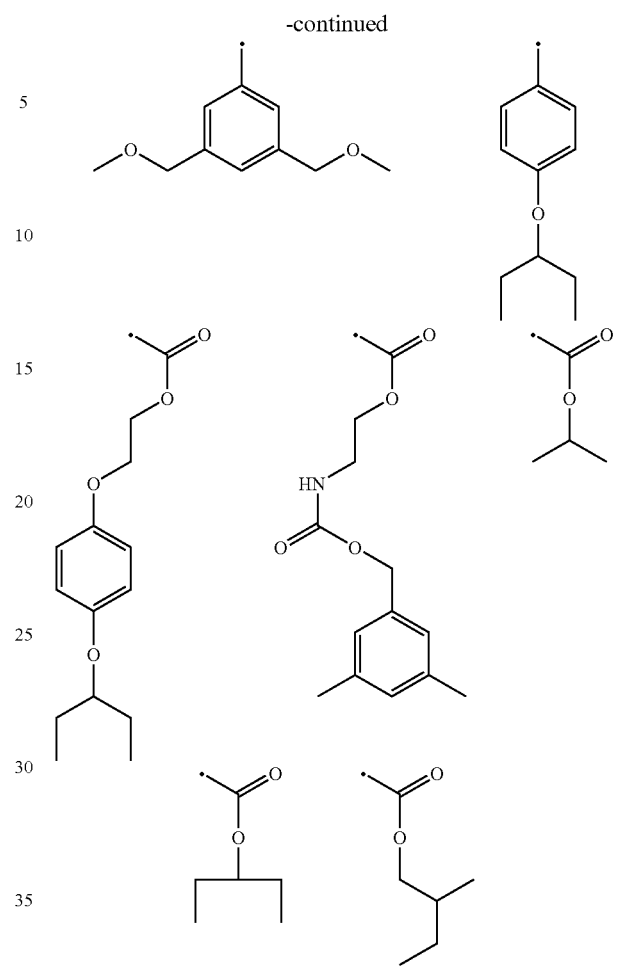

(The symbol • in the formulae represents a terminal binding to the carbon atom to which $R_3$ binds. Binding sites for those which are not described are not limited).

Y may be the same or different and each represents a functional group which may have an active halogen atom; and a is an integer of 2 or larger.

The term referred to here as a "functional group which may have an active halogen atom" means a functional group with a structure where a halogen atom becomes an active halogen atom when the halogen atom is bound to a constituting carbon atom. Specifically, functional groups which may have a halogen atom at the a-position in the electron-withdrawing group and the like such as a carbonyl group, ester group, amide group, sulfonyl group, nitrile group, and nitro group, can be shown as examples.

Examples of halogen atoms binding to Y include a fluorine atom, chlorine atom, bromine atom, and iodine atom and chlorine and bromine atoms are preferable.

Specific examples of Y include functional groups shown below.

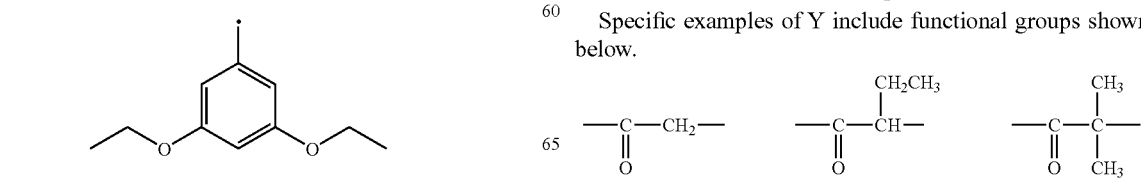

-continued

Moreover, when X is an aromatic hydrocarbon group or an aromatic heterocyclic group, examples of Y include functional groups shown below.

In the present invention, the repeating units represented by the formula (I) are preferably the repeating units represented by the formula (II).

In the formula (II), $R_1$ to $R_3$ are as defined above and Z represents a single bond or a connecting group having a valence of 2 or higher.

Examples of such connecting groups include those shown below.

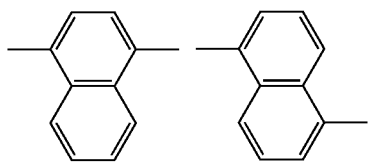

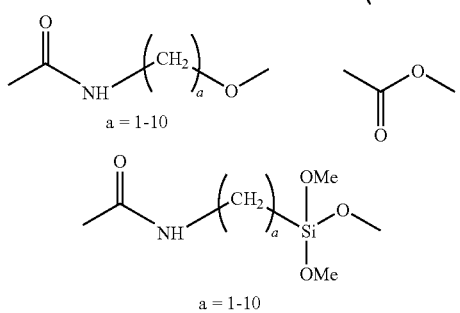

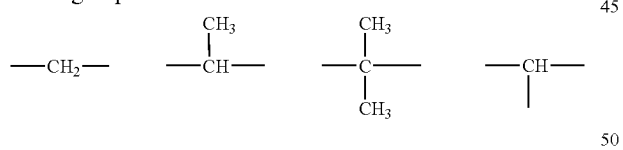

The connecting group having a valence of 2 or higher is not limited as long as it is a functional group with 2 or more linkages.

In the formula (II), A represents an aromatic hydrocarbon group or an aromatic heterocyclic group.

Examples of aromatic hydrocarbon groups include a phenyl group, 1-naphthyl group, 2-naphthyl group, and anthranyl group. Moreover, examples of aromatic heterocyclic groups include pyridine, pyrrole, furan, thiophene, oxazole, isoxazole, imidazole, pyrazole, thiazole, isothiazole, indole, and benzimidazole.

$R_4$ may be the same or different and each represents a functional group which may have an active halogen atom at its terminal. b is an integer of 2 or higher.

Specific examples of $R_4$ include those similar to the ones shown as examples of Y.

$R_5$ represents a halogen atom or an organic group and d is 0 or an integer of 1 or larger. When d is 2 or larger, $R_5$ may be the same or different and moreover, $R_5$ may bond with each other to form a ring.

Specific examples of $R_5$ include halogen atoms such as a fluorine atom, chlorine atom, bromine atom, and iodine atom; hydrocarbon groups such as a methyl group, ethyl group, n-propyl group, isopropyl group, n-butyl group, sec-butyl group, isobutyl group, t-butyl group, n-pentyl group, n-hexyl group, cyclohexyl group, phenyl group, naphthyl group, and benzyl group; and alkoxy groups such as a methoxy group and ethoxy group.

In the present invention, the repeating units represented by the formula (II) are more preferably the repeating units where Z is a single bond, A is an aromatic hydrocarbon group and $R_4$ is a functional group represented by the formula (III).

In the formula (III), $R_6$ and $R_7$ each independently represents hydrogen, a halogen atom, an alkyl group which may have a substituent, or a linkage with other repeating units with a proviso that $R_6$ and $R_7$ do not become linkages with other repeating units at the same time.

Examples of halogen atoms of $R_6$ and $R_7$ include a fluorine atom, chlorine atom, bromine atom, and iodine atom. Examples of alkyl groups which may have a substituent include a methyl group, ethyl group, n-propyl group, isopropyl group, n-butyl group, sec-butyl group, isobutyl group, t-butyl group, n-pentyl group, n-hexyl group, benzyl group, and trifluoromethyl group. Although the number of carbon atoms in the alkyl group which may have a substituent is not particularly limited, 1 to 6 carbon atoms are preferable.

Moreover, being a linkage with other repeating units refers to a state where a polymer chain is further extended while having a carbon atom where $R_6$ and $R_7$ are binding as an origin; for example, a case where polymerization is carried out using halide compounds such as those with a —$CHCl_2$ group.

Furthermore, in the present invention, the repeating units represented by the formula (I) are preferably the repeating units represented by the formula (IV).

In the formula (IV), $R_1$ to $R_3$ are as defined above and V represents a connecting group having a valence of 3 or higher and is not particularly limited as long as it is a functional group with 3 or more linkages. Specific examples include the same functional groups as those shown as examples of X described earlier, and particularly, polyoxyalkylene groups are preferable.

Specific examples of polyoxyalkylene groups include connecting groups shown below.

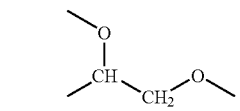
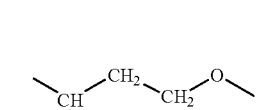
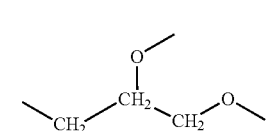
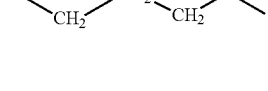
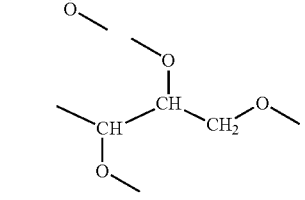

-continued

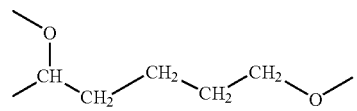

In the formula (IV), Y is as defined above and is preferably the repeating units represented by the formula (V).

In the formula (V), $R_{61}$, and $R_{71}$, represent the same as that of $R_6$ and $R_7$ described earlier and are not particularly limited as long as each independently is a functional group representing hydrogen, a halogen atom, an alkyl group which may have a substituent, or a linkage with other repeating units with a proviso that $R_{61}$, and $R_{71}$, do not become linkages with other repeating units at the same time. Specific examples include the same functional groups described earlier.

Specific examples of the formula (I) include those shown below.

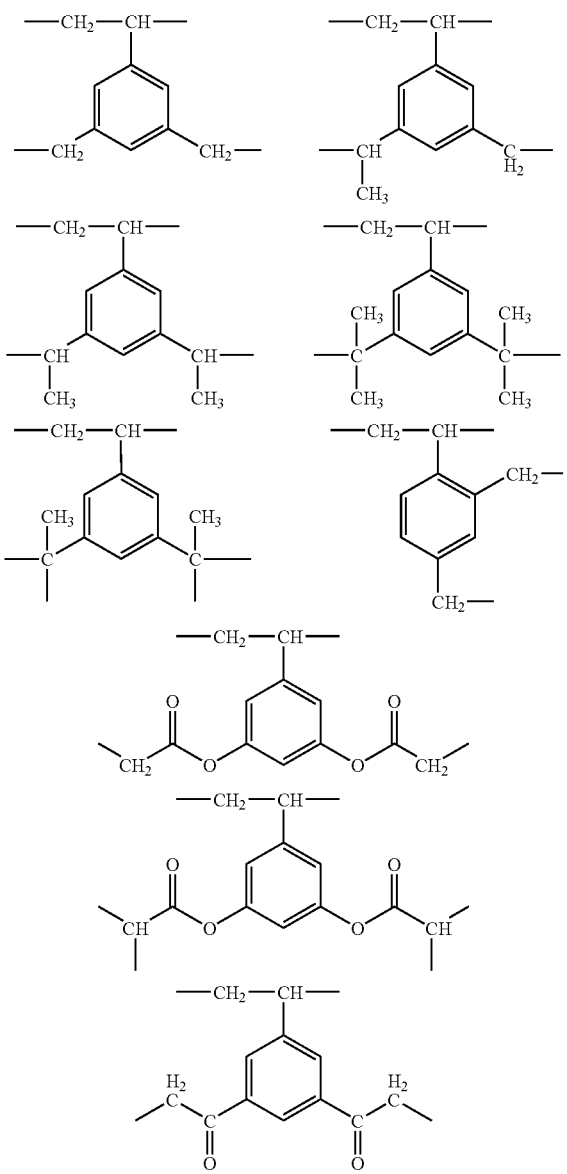

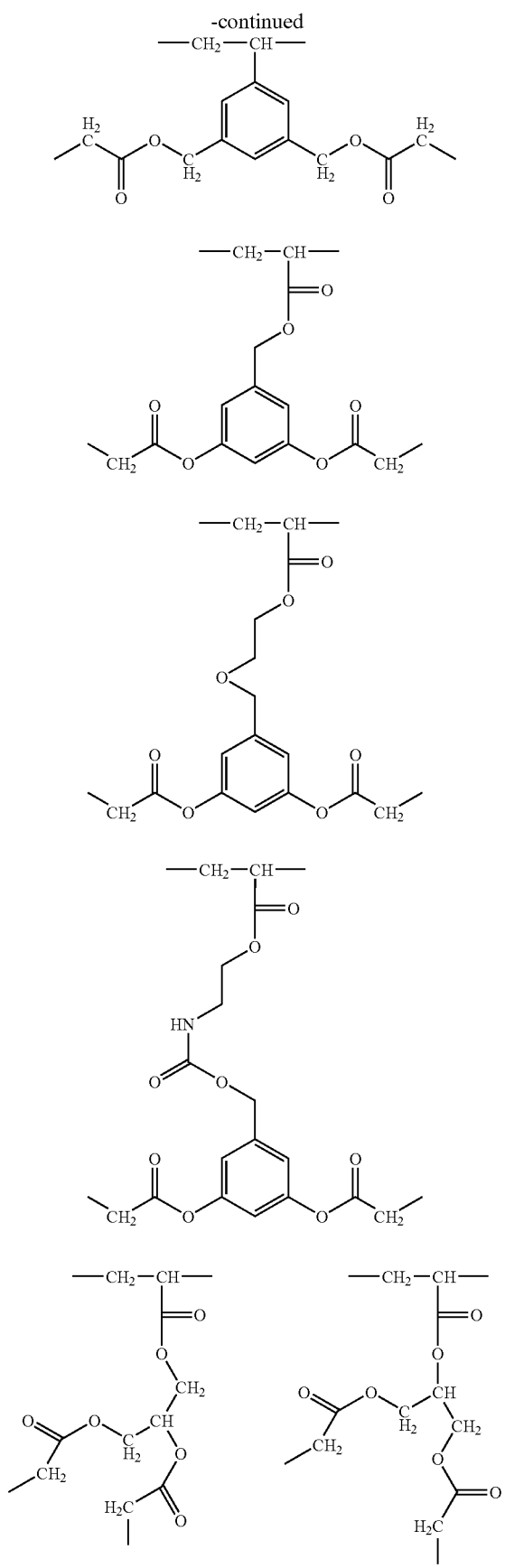

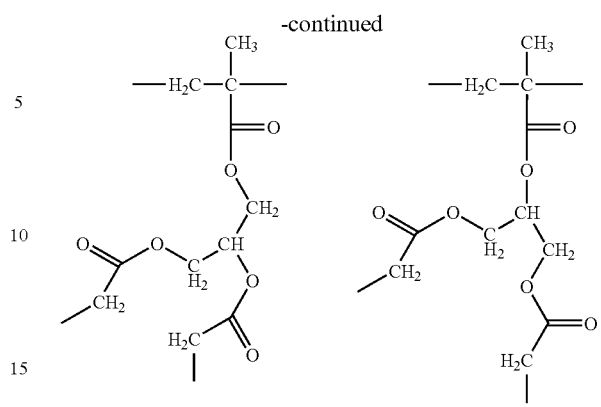

The multi-branched polymer of the present invention has a characteristic which has hitherto not been present since it has a low degree of dispersion (narrow dispersion) and moreover its branch terminals can be easily modified despite having a high degree of branching.

Although the number average molecular weight (Mn) of the multi-branched polymer of the present invention is not particularly limited, a preferable range is between 200 and 20,000,000.

Although the ratio (Mw/Mn) of the weight average molecular weight to the number average molecular weight (Mn) of the multi-branched polymer of the present invention is not particularly limited, a preferable range is between 1.01 and 9.99 and the range between 1.01 and 5.50 is more preferable and the range between 1.01 and 2.50 is particularly preferable.

The multi-branched polymer of the present invention is preferably a hyperbranched polymer. Hyperbranched polymer is a polymer with branches on branches and contains a mixture of linear and completely branched repeating units similar to dendritic polymers such as a dendrimer.

The multi-branched polymer of the present invention can be modified by reacting an active halogen atom remaining at the molecular terminal thereof. For example, it is possible to acetylate by reacting with an acetate salt.

(2) Multi-Branched Polymer Production

Preferable examples of the production method of the multi-branched polymer of the present invention include a living radical polymerization method using a compound represented by the formula (VI) as a monomer, although the method is not particularly limited as long as it is capable of obtaining a polymer with repeating units represented by the formula (I). According to this method, it is possible to produce the multi-branched polymer of the present invention whose structure is controlled readily and efficiently.

In the formula (VI), $R_8$ to $R_{10}$ each independently represents hydrogen or a hydrocarbon group and $R_8$ may be bonded to $R_{10}$ to form a ring. Specific examples of $R_8$ to $R_{10}$ include those similar to the ones listed as the specific examples of $R_1$ to $R_3$.

$X_1$ represents a connecting group having a valence of 3 or higher and its specific examples include those similar to the ones listed as the specific examples of X.

$Y_1$ represents a functional group which may have an active halogen atom at the terminal thereof and its specific examples include those similar to the ones listed as the specific examples of Y.

a1 is an integer of 2 or larger and $Y_1$ may be the same or different.

$R_{11}$ represents a chlorine atom, a bromine atom, or an iodine atom.

In the present invention, use of compounds represented by the formulae (VII) and (IX) as the compounds represented by the formula (VI) is preferable.

In the formula (VII), $Z_1$ represents a single bond or a connecting group having a valence of 2 or higher and its specific examples include those listed as the specific examples of Z.

A1 represents an aromatic hydrocarbon group or an aromatic heterocyclic group and its specific examples include those similar to the ones listed as the specific examples of A.

$R_{24}$ may be the same or different and each represents a functional group which may have an active halogen atom at the terminal thereof and b1 is an integer of 2 or larger. Specific examples of $R_{24}$ include those similar to the ones listed as the specific examples of $R_4$.

$R_{25}$ represents a halogen atom or an organic group and d1 is 0 or an integer of 1 or larger and $R_{25}$ may be the same or different when d1 is 2 or larger. Specific examples of $R_{25}$ include those similar to the ones listed as the specific examples of $R_5$.

$R_{26}$ represents a chlorine atom, a bromine atom, or an iodine atom.

In the present invention, among the compounds represented by the formula (VII), it is more preferable to use the compounds where $Z_1$ is a single bond, A1 is an aromatic hydrocarbon group, and $R_{24}$ is a functional group represented by the formula (VIII).

In the formula (VIII), $R_{60}$ and $R_{70}$ each independently represents hydrogen, a halogen atom, or a C1 to C6 alkyl group which may have a substituent with a proviso that $R_{60}$ and $R_{70}$ are not halogen atoms other than fluorine atoms at the same time. Specific examples of $R_{60}$ and $R_{70}$ include those similar to the ones listed as the specific examples of $R_6$ and $R_7$.

In the formula (IX), VI, represents a connecting group having a valence of 3 or higher, same as V described earlier, and its specific examples include those similar to the ones listed as the specific examples of X.

$R_8$ to $R_{10}$ are as defined above respectively and $Y_1$ represents a functional group which may have an active halogen atom. Specific examples of $R_8$ to $R_{10}$ include those similar to the ones listed as the specific examples of $R_1$ to $R_3$ and specific examples of $Y_1$ include those similar to the ones listed as the specific examples of Y.

a1 is an integer of 2 or larger and $Y_1$ may be the same or different.

$R_{11}$, represents a chlorine atom, a bromine atom, or an iodine atom.

In the formula (X), $R_{610}$ and $R_{710}$ each independently represents hydrogen, a halogen atom, or a C1 to C6 alkyl group which may have a substituent with a proviso that $R_{610}$ and $R_{710}$ are not halogen atoms other than fluorine atoms at the same time. Specific examples of $R_{610}$ and $R_{710}$ include those similar to the ones listed as the specific examples of $R_6$ to $R_7$.

Specific examples of the compounds represented by the formula (VI) include those shown below. In the formulae described below, $R_{261}$ to $R_{264}$ each independently represents a halogen atom such as a chlorine atom and bromine atom.

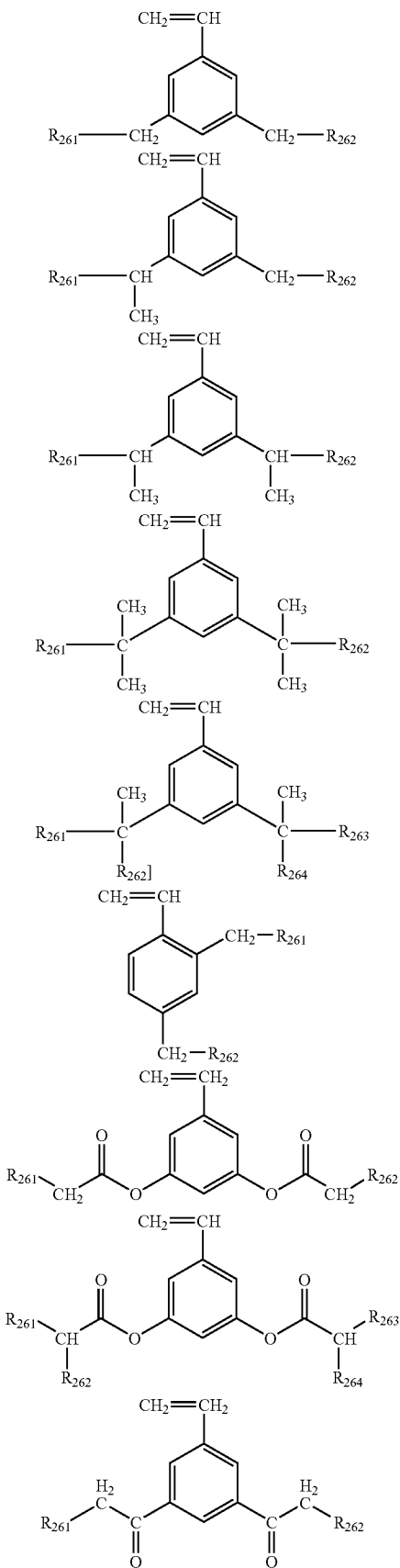

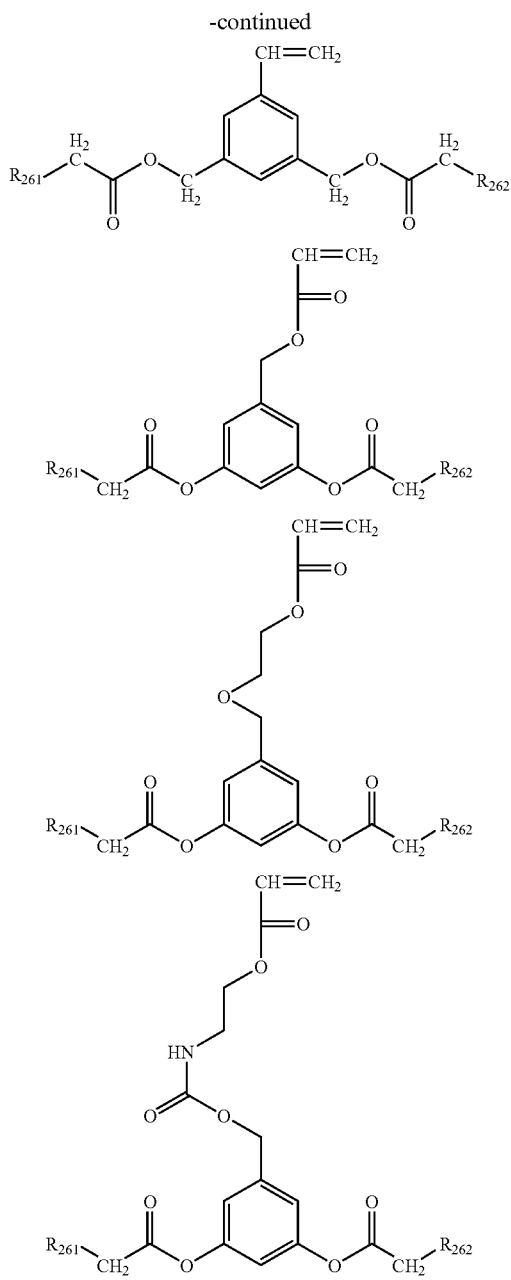

Specific examples of the compounds represented by the formula (IX) include those shown below. In the formulae described below, $R_{265}$ to $R_{268}$ each independently represents a halogen atom such as a chlorine atom and bromine atom.

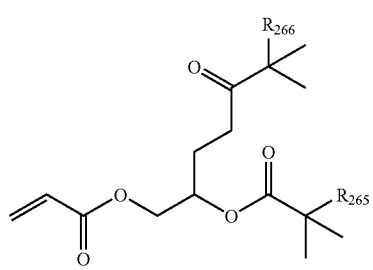

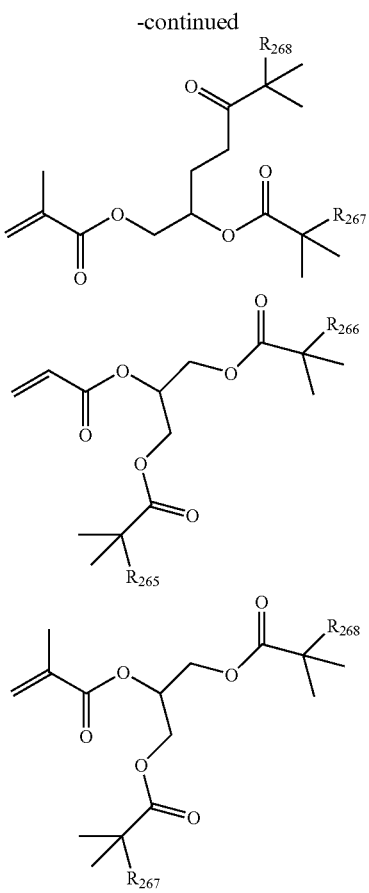

Examples of catalysts used in a living radical polymerization method include the known metal complexes. Among them, monovalent copper complex, divalent iron complex, divalent ruthenium complex and tellurium complex are preferable. Examples which are more preferable include monovalent copper complexes such as cuprous chloride, cuprous bromide, cuprous iodide, cuprous cyanide, cuprous oxide, cuprous acetate, and cuprous perchlorate; and tellurium complexes such as (1-ethoxycarbonyl-1-methylethyl)methyl tellurium, (1-cyano-1-methylethyl)methyl tellurium, α-methyl benzyl methyl tellurium, benzyl methyl tellurium, and methyl benzoyl tellurium.

When copper compounds are used, it is possible to add 2,2'-bipyridyl, 1,10-phenanthroline, alkylamines (tributylamine and so forth), polyamines (tetramethylethylenediamine, pentamethyldiethylenetriamine, hexamethyltriethylenetetramine, and so forth) and the like as a ligand for enhancing catalytic activity.

Although the amount of catalyst used can be appropriately selected depending on the molecular weight of the desired multi-branched polymer, the preferable range is between 1 to 50 mol % relative to a monomer used and more preferably between 5 to 45 mole % and even more preferably between 20 to 40 mol %.

Furthermore, in the living radical polymerization method, known Lewis acids and/or amines can be used as an activating reagent to accelerate radical polymerization by acting on the transition metal complex.

Although the polymerization method is not particularly limited and common methods such as bulk polymerization, solution polymerization, suspension polymerization, or emulsion polymerization can be adopted, solution polymerization is particularly preferable.

When solution polymerization is carried out, the solvent is not particularly limited. For example, aromatic hydrocarbons such as benzene, toluene, and xylene; alicyclic hydrocarbons such as cyclohexane; aliphatic hydrocarbons such as n-hexane and n-octane; ketones such as acetone, methylethylketone, and cyclohexanone; ethers such as tetrahydrofuran and dioxane; esters such as ethyl acetate and butyl acetate; amides such as N,N-dimethylformamide and N,N-dimethylacetamide; sulfoxides such as dimethylsulfoxide; alcohols such as methanol and ethanol; polyalcohol derivatives such as ethylene glycol monomethyl ether and ethylene glycol monomethyl ether acetate; can be used.

Such solvents can be used singly or in combination of two or more types.

It is possible to manufacture the multi-branched polymer of the present invention by polymerizing the compound represented by the formula (VI) by a living radical polymerization method. Specific methods for living radical polymerization of the compounds represented by the formula (VI) include the following methods (a) to (d).

(a) a method for producing a multi-branched polymer composed of a homopolymer of the compound represented by the formula (VI).
(b) a method for producing a multi-branched polymer composed of a random copolymer by adding the compound represented by the formula (VI) and another polymerizable unsaturated monomer to the reaction system at the same time.
(c) a method for producing a multi-branched polymer composed of a random copolymer by adding the compound represented by the formula (VI) and another polymerizable unsaturated monomer to the reaction system sequentially.
(d) a method for producing a multi-branched polymer composed of a gradient copolymer by adding the compound represented by the formula (VI) and another polymerizable unsaturated monomer to the reaction system sequentially.

Polymerization can usually be carried out in a vacuum or under an atmosphere of inert gases such as nitrogen and argon, at a temperature between 0 and 200° C., preferably 40 and 150° C., and more preferably 80 and 120° C., and under normal or increased pressure.

Tracing of the polymerization reaction process and verifying of the reaction termination can be readily performed by gas chromatography, liquid chromatography, gel permeation chromatography, membrane osmometry, NMR, and so forth.

Copolymers can be obtained by adopting a column purification, or a standard separation and purification method such as filtering and drying of the polymer components deposited when introduced in water or in a poor solvent, after the termination of the copolymerization reaction.

Although the molecular weight of the multi-branched polymer of the present invention is not particularly limited, the number average molecular weight (Mn) is preferably in a range between 200 and 20,000,000 and ranges between 1,000 and 20,000,000, and between 5,000 and 150,000 can be shown as more preferable examples.

Although the ratio (Mw/Mn) of the weight average molecular weight (Mw) to number average molecular weight (Mn) is not particularly limited, a preferable range is between 1.01 and 9.99 and ranges between 1.01 and 5.50, between 1.01 and 2.50 can be shown as more preferable examples.

It should be noted that values measured using a multi-angle light scattering detection method (hereinafter abbreviated as MALS method) were adopted for the number average molecular weight (Mn) and the ratio (Mw/Mn) of the weight average molecular weight (Mw) to number average molecular weight (Mn).

Moreover, among multi-branched polymers with various shapes and properties, it has become possible to control the molecular weight to produce hyperbranched polymers whose molecular weight has hitherto been thought difficult to control, by using the method of the present invention. In other words, it has become possible to produce hyperbranched polymers with properties which have hitherto not been present.

Furthermore, the multi-branched polymer of the present invention can also extend the polymer chain thereof by using this terminal functional group characterized by being capable of having a functional group which is convertible to another functional group at its terminal.

2) Star Polymer

The star polymer of the present invention is characterized by having the multi-branched polymer of the present invention as a core.

The star polymer using the multi-branched polymer of the present invention is characterized in that it can select polymers with different degree of branching freely to use as a core and is capable of changing the number of arms when needed.

Specific examples of the method for producing the star polymer of the present invention include (1) a method for extending the polymer chain as an arm with a living radical polymerization method by using a terminal functional group of the multi-branched polymer of the present invention, and
(2) a method for reacting the polymer chain having a terminal, which may react, with the terminal functional group of the multi-branched polymer prepared in advance by using a terminal functional group of the multi-branched polymer of the present invention. The method shown in (1) is particularly preferable since when it is used, it is possible to use the terminal functional group effectively and also to arrange the molecular weight of the arm polymer chain since the polymer chain gradually extends from the terminal of the multi-branched polymer.

DETAILED DESCRIPTION OF THE INVENTION

Figure 1:
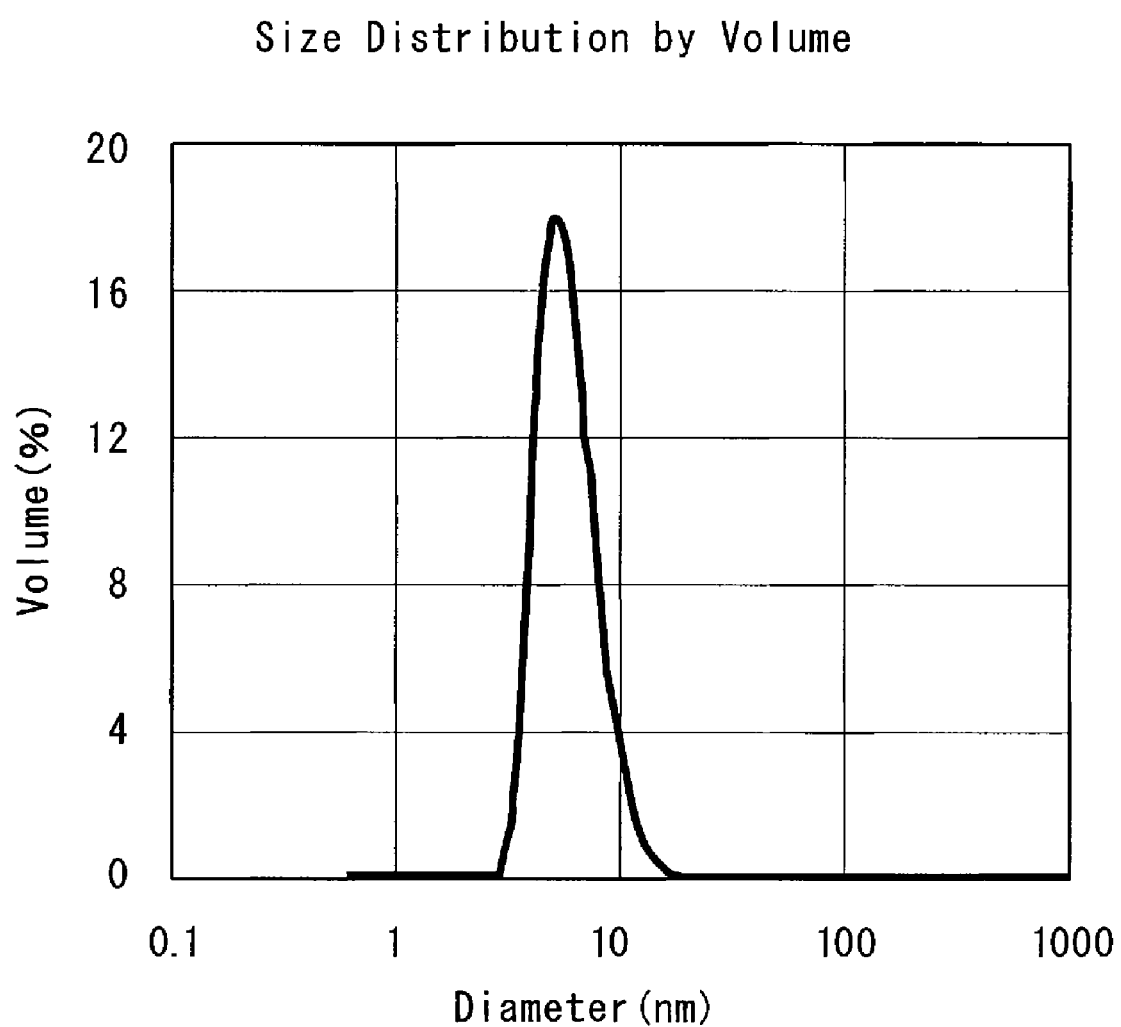
FIG. 1 is a diagram showing a particle size of the multi-branched polymer I obtained in Example 1 in 2 wt % tetrahydrofuran solution.

Although the present invention will be described in further detail below using examples, the scope of the present invention is not limited to the examples.

EXAMPLES

Synthesis Example (1) 3,5-bis(Chloromethyl)Styrene (BCMS) Synthesis

Grignard solution was prepared from 13.4 g (54.7 mmol) of 3,5-bis(methoxymethyl)bromobenzene, 3.25 g (134 mmol) of magnesium, and 60 ml of tetrahydrofuran (hereinafter abbreviated as "THF") in a reaction vessel of 200 ml. Subsequently, 30 ml (387 mmol) of dimethylformamide (DMF) was added dropwise into this solution at 0° C. and further agitated at room temperature for 3 hours after completion of the addition. Solvent was removed from the obtained reaction liquid by reduced pressure and 2N hydrochloric acid was added. The obtained reaction mixture was extracted 3 times with 50 ml of diethyl ether and the organic layer was collected and dried with anhydrous magnesium sulfate after rinsing with water. Residues obtained by the removal of solvent were purified by silica gel column chromatography to obtain 8.36 g (43.0 mmol) of the target 3,5-bis(methoxymethyl)benzaldehyde as a viscous liquid.

Yield was 79%.

Then 30 ml of THF solution containing 8.36 g (43.0 mmol) 3,5-bis(methoxymethyl)benzaldehyde was added dropwise into 40 ml of THF solution containing 18.5 g (51.7 mmol) of methyltriphenylphosphonium bromide and 7.24 g (64.5 mmol) of potassium tertiary butoxide at 0° C. After agitating the reaction liquid for 3 hours at 0° C., 30 ml of water was added to deactivate the remaining potassium tertiary butoxide. The organic layer was aliquoted and the aqueous layer was extracted 3 times with 50 ml of ether and the organic layer was collected and dried with anhydrous magnesium sulfate. Excess methyltriphenylphosphonium bromide and triphenylphosphine oxide were precipitated by adding 80 ml of n-hexane to the residues obtained by the removal of solvent. After removing insolubles by filtration, the concentrated filtrate was purified by silica gel column chromatography to obtain 5.52 g (28.7 mmol) of the target 3,5-bis(methoxymethyl)styrene as a colorless oily matter.

Yield was 67%.

Subsequently, 2.76 g (14.4 mmol) of 3,5-bis(methoxymethyl)styrene was dissolved in 30 ml of carbon tetrachloride in a reaction vessel of 200 ml, then 40 ml of methylene chloride solution containing 1.0 M boron trichloride was added dropwise at 0° C., and further agitated at 0° C. for 12 hours. After treating the excess boron trichloride by adding methanol to the reaction liquid, the resultant was poured into 150 ml of 5% NaOH solution (added with 100 g of ice). The organic layer was aliquoted and dried with anhydrous magnesium sulfate. Residues obtained by the removal of solvent were purified by silica gel column chromatography to obtain 1.57 g (7.81 mmol) of the target 3,5-bis(chloromethyl)styrene as a transparent liquid. Yield was 54%.

(2) 2,3-bis(2-bromo-2-methyl-propanoyloxy-propyl-2-methyl-propenate) Synthesis

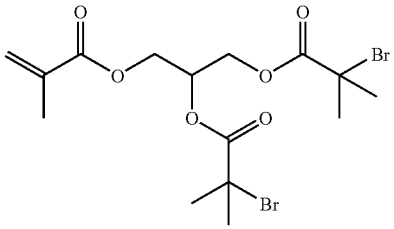

In a reaction vessel of 500 ml, 7.8 g (55 mmol) of glycidyl methacrylate and 18.3 g (110 mmol) of 2-bromoisobutyrate were prepared and 16.3 g (161.4 mmol) of triethylamine was added dropwise and agitated at 70° C. for 5 hours. After being cooled and dissolved in chloroform, the solution was rinsed with saturated sodium bicarbonate solution. This extracted solution was concentrated and compound formation was verified by $^1$H-NMR.

Then 5.94 g (75 mmol) of pyridine was added to this extracted solution and 13.8 g (60 mmol) of 2-bromo isobutyryl bromide was added when cooled to 0° C. and agitated at room temperature overnight. The reaction liquid was rinsed with water, extracted with chloroform, and after being dried with anhydrous magnesium sulfate, the concentrated solution was purified by silica gel column chromatography (hexane:ethyl acetate=4:1) to obtain 22.4 g (Yield was 89% when converted to prepared glycidyl methacrylate) of a colorless transparent viscous compound.

Example 1

(3) Synthesis of Multi-Branched Polymer 1

In a reaction vessel of 100 ml, 2.88 g (11.3 mmol) of 3,5-bis(chloromethyl)styrene obtained in (1) described above, 0.336 g (3.40 mmol) of cuprous chloride, 1.06 g (6.80 mmol) of bipyridyl, and 12 ml of chlorobenzene were added, and after mixing to homogeneity, the inside was degassed using a water jet aspirator. The reaction vessel was sealed after the reaction system was replaced with nitrogen and agitated for 90 minutes in an oil bath set to 115° C. in advance. Then approximately 20 ml of THF was added to the reaction mixture and agitated for about 30 minutes in air at room temperature. The obtained mixture was purified by alumina column and by reprecipitating with methanol, 1.04 g of multi-branched polymer 1 was obtained as a yellow viscous matter. The weight average molecular weight of this obtained matter was Mw=3958 (Mw/Mn=1.74) as a result of measurement by a gel permeation chromatography method (hereinafter abbreviated as "GPC method") when converted to polystyrene, and Mw=14510 (Mw/Mn=1.71) by multi-angle light scattering detection method (hereinafter abbreviated as MALS method).

(4) Particle Size Distribution of Multi-Branched Polymer 1 Solution

<Measuring Method of Particle Size Distribution>

The multi-branched polymer 1 obtained in Example 1 was dissolved in tetrahydrofuran (THF) to prepare solutions of 0.03, 0.2, 2, and 5 wt %.

Particle size was measured using HPPS (particle size measuring apparatus manufactured by MALVERN Instruments, Ltd.)

<Results of Particle Size and Particle Size Distribution Measurements>

Average particle sizes were 6.2 nm (5 wt % solution), 7.2 nm (2 wt % solution), 8.0 nm (0.2 wt % solution), and 6.4 nm (0.03 wt % solution), respectively. Moreover, the particle size distribution of 2 wt % solution is shown in FIG. 1.

Similarly, average particle sizes of 2 wt % solutions prepared by toluene, hexane, acetone, dimethylformamide, and chloroform instead of tetrahydrofuran solvent were all 7 nm and influence of solvents was not observed.

Moreover, it became clear from FIG. 1 that the solution of multi-branched polymer 1 is a transparent solution containing nanoparticles with monodispersed particle size distribution.

Example 2

(5) Synthesis of Multi-Branched Polymer 2

In a reaction vessel of 100 ml, 2.10 g (4.58 mmol) of the monomer obtained in (2) described above, 0.197 g (1.37 mmol) of cuprous bromide, 0.43 g (2.75 mmol) of bipyridyl, and 7.9 g of chlorobenzene were added, and after mixing to homogeneity, the inside was degassed using a water jet aspirator. The reaction vessel was sealed after the reaction system was replaced with nitrogen and agitated for 90 minutes in an oil bath set to 110° C. in advance. The obtained mixture was purified by silica gel column chromatography using tetrahydrofuran (THF) solvent and the concentrated solution was reprecipitated twice with hexane. 0.68 g (yield 32%) of multi-branched polymer 2 was obtained as a colorless transparent viscous compound. The weight average molecular weight of this compound was Mw=9640 (Mw/Mn=1.18) as a result of measurement by the "GPC method" when converted to polystyrene, and Mw=5144 (Mw/Mn=1.16) by the "MALS method".

Example 3

(6) Modification of Multi-Branched Polymer by Polymer Arm (Synthesis of Multi-Branched Polymer 3)

In a reaction vessel of 200 ml replaced with nitrogen, 53 g of toluene and 5.4 g of THF were added and cooled to −40° C. Then 3.2 g of n-butyllithium/hexane solution (1.61 mol/l) was slowly added dropwise thereto and 10.0 g (56.7 mmol) of p-tert-butoxystyrene was further added to carry out living anion polymerization.

After verifying the consumption of the monomer by gas chromatography (GC), samples were colleted to confirm that the polymer of Mn=3903 (Mw/Mn=1.16) was obtained by the GPC method.

In the reaction liquid, 5 ml of toluene solution containing 0.5 g of multi-branched polymer (multi-branched polymer 1) obtained in example 1 was added and reacted at −40° C. for 30 minutes. The reaction was terminated by adding methanol (MeOH) to the reaction liquid and 8.70 g of a light yellow colored solid (multi-branched polymer 2) was obtained by reprecipitation. The weight average molecular weight of the obtained multi-branched polymer 2 was Mw=112,000, and Mw/Mn=1.19.

Example 4

(7) Conversion of Functional Group of Multi-Branched Polymer (Synthesis of Multi-Branched Polymer 4)

In a reaction vessel of 100 ml, 0.5 g of multi-branched polymer (multi-branched polymer 2) synthesized in Example 2, 1.96 g (20.0 mmol) of potassium acetate, 0.20 g (0.6 mmol) of tetrabutylammonium bromide, 0.1 ml of acetic acid, 6.0 ml of water, and 10 ml of chlorobenzene were added and the whole solution was agitated at 80° C. for 5 days.

The reaction mixture was separated and the organic layer was aliquoted. By reprecipitating the organic layer, 0.7 g of a light brown viscous matter (multi-branched polymer 3) was obtained. The weight average molecular weight of the obtained multi-branched polymer 3 was Mw=16,510. Moreover, it was verified by $^1$H-NMR measurement that the degree of conversion of reaction with the acetyl group was 80%.

INDUSTRIAL APPLICABILITY

As described so far, the multi-branched polymer of the present invention has a characteristic which has hitherto not been present since it has a low degree of dispersion and moreover its branch terminals can be easily modified despite having a high degree of branching.

Furthermore, the multi-branched polymer of the present invention is readily developed variously such as modification by a polymer arm and conversion of the functional group at the terminal of the branched chain depending on purpose.

The multi-branched polymer of the present invention can be widely applied to molecular devices required to control nanoscale structures including hardening resins and various additives such as resist, ink, coating material, electric/electronic material, sealing agent, and film material, and thus, it can be said that its industrial utility value is high.

The invention claimed is:

1. A multi-branched polymer having repeating units represented by a formula (IV):

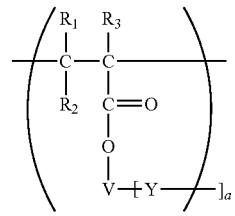

(wherein $R_1$ to $R_3$ each independently represents hydrogen or a hydrocarbon group, $R_1$ may be bonded to $R_3$ to form a ring; Y may be the same or different and each represents a functional group with a structure where a halogen atom becomes an active halogen atom when the halogen atom is bound to a constituting carbon atom; a is an integer of 2 or larger; and V represents an polyoxyalkylene group having a valence of 3 or higher).

2. The multi-branched polymer according to claim 1, wherein in the formula (IV), Y is a functional group represented by a formula (V):

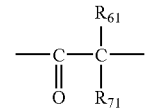

(wherein R61 and R71 each independently represents hydrogen, a halogen atom, an alkyl group which may have a substituent, or a linkage with other repeating units with a proviso that $R_{61}$ and $R_{71}$ do not become linkages with other repeating units at the same time).

3. A process for preparing multi-branched polymer comprising: living radical polymerization of the compounds represented by a formula (VI):

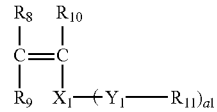

(wherein $R_8$ to $R_{10}$ each independently represents hydrogen or a hydrocarbon group, and $R_8$ may be bonded to $R_{10}$ to form a ring; $X_1$ represents a connecting group having a valence of 3 or higher; $Y_1$ may be the same or different and each represents a functional group with a structure where a halogen atom becomes an active halogen atom when the halogen atom is bound to a constituting carbon atom; a1 is an integer of 2 or larger, $Y_1$ is selected from the functional groups of;

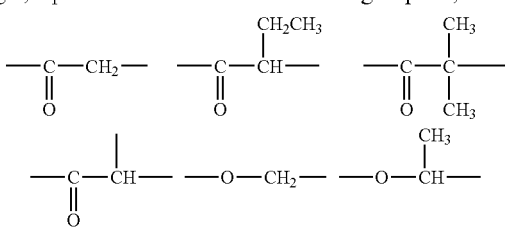

-continued

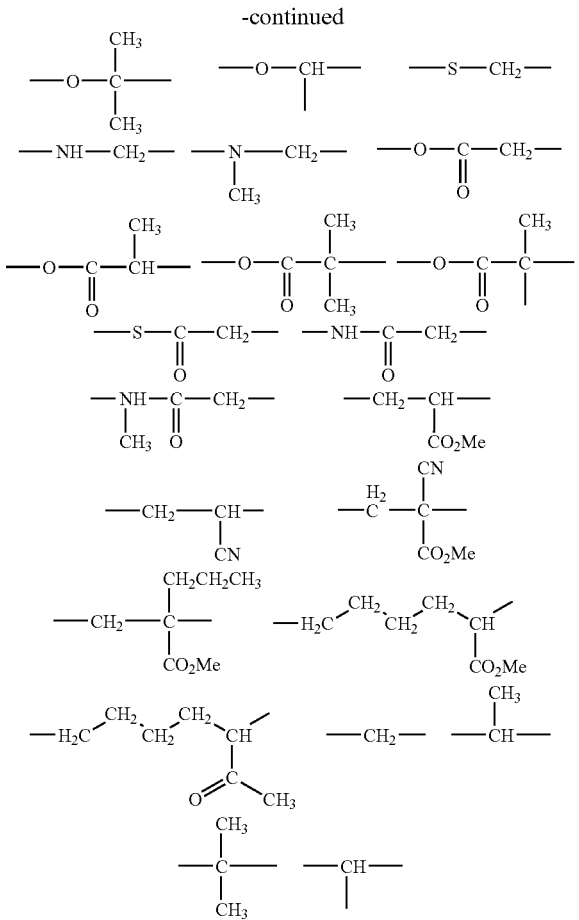

and, when $X_1$ is an aromatic hydrocarbon group or an aromatic heterocyclic group, $Y_1$ is selected from the functional groups of;

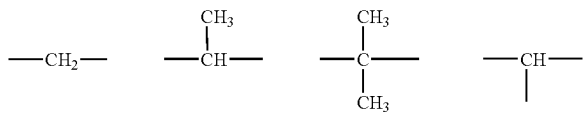

and $R_{11}$ represents a chlorine atom, a bromine atom, or an iodine atom) using a metal catalyst, wherein the reactions at the polymerization-initiation site and the polymerizable unsaturated bond in formula (VI) are performed simultaneously.

4. The process for preparing multi-branched polymer according to claim 3, wherein the compounds represented by the formula (VI) are compounds represented by formula (VII):

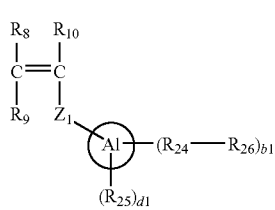
(VII)

(wherein $R_8$ to $R_{10}$ are as defined above; $Z_1$ represents a single bond or a connecting group having a valence of 2 or higher; A1 represents an aromatic hydrocarbon group or an aromatic heterocyclic group; $R_{24}$ may be the same or different and each represents a functional group which may have an active halogen atom; b1 is an integer of 2 or larger; $R_{25}$ represents a halogen atom or an organic group and d1 is 0 or an integer of 1 or larger and $R_{25}$ may be the same or different when d1 is 2 or larger; $R_{26}$ represents a chlorine atom, a bromine atom, or an iodine atom).

5. The process for preparing multi-branched polymer according to claim 4, wherein in the formula (VII), $Z_1$ is a single bond, A1 is an aromatic hydrocarbon group, and $R_{24}$ is a functional group represented by a formula (VIII):

(VIII)

(wherein $R_{60}$ and $R_{70}$ each independently represents hydrogen, a halogen atom, or a C1 to C6 alkyl group which may have a substituent with a proviso that $R_{60}$ and $R_{70}$ are not halogen atoms other than fluorine atoms at the same time).

6. The process for preparing multi-branched polymer according to claim 3, wherein the compounds represented by the formula (VI) are compounds represented by a formula (IX):

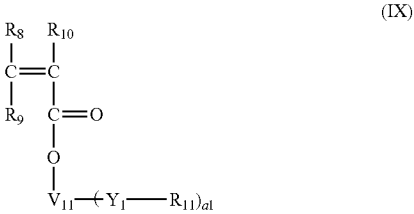
(IX)

(wherein $R_8$ to $R_{10}$ are as defined above respectively; $V_{11}$ represents a connecting group having a valence of 3 or higher; $Y_1$ may be the same or different and each represents a functional group which may have an active halogen atom; a1 is an integer of 2 or larger; and $R_{11}$ represents a chlorine atom, a bromine atom, or an iodine atom).

7. The process for preparing multi-branched polymer according to claim 6, wherein $V_{11}$ is an polyoxyalkylene group in the formula (IX).

8. The process for preparing multi-branched polymer according to claim 6 or 7, wherein in the formula (IX), $Y_1$ is a functional group represented by a formula (X):

(X)

(wherein $R_{610}$ and $R_{710}$ each independently represents hydrogen, a halogen atom, an alkyl group which may have a substituent, or a linkage with other repeating units with a proviso that $R_{610}$ and $R_{710}$ do not become linkages with other repeating units at the same time).

9. The multi-branched polymer according to any one of claim 1 or 3, wherein a ratio (Mw/Mn) of weight average molecular weight (Mw) to number average molecular weight (Mn) of the polymer is in a range between 1.01 and 9.99.

10. The multi-branched polymer according to any one of claim 1 or 3, wherein the number average molecular weight (Mn) of the polymer is in a range between 200 and 20,000,000.

11. The multi-branched polymer according to any one of claim 1 or 3, wherein the multi-branched polymer is a hyperbranched polymer.

12. A star polymer having the multi-branched polymer according to claim 1 or 3.

* * * * *